June 2, 1970    C. PAGANELLI    3,515,454
SYSTEM FOR ARTIFICIALLY SEEING IN THREE
DIMENSIONS WITHOUT USING GLASSES OR
OTHER INTERPRETING MEANS
Filed Oct. 21, 1966
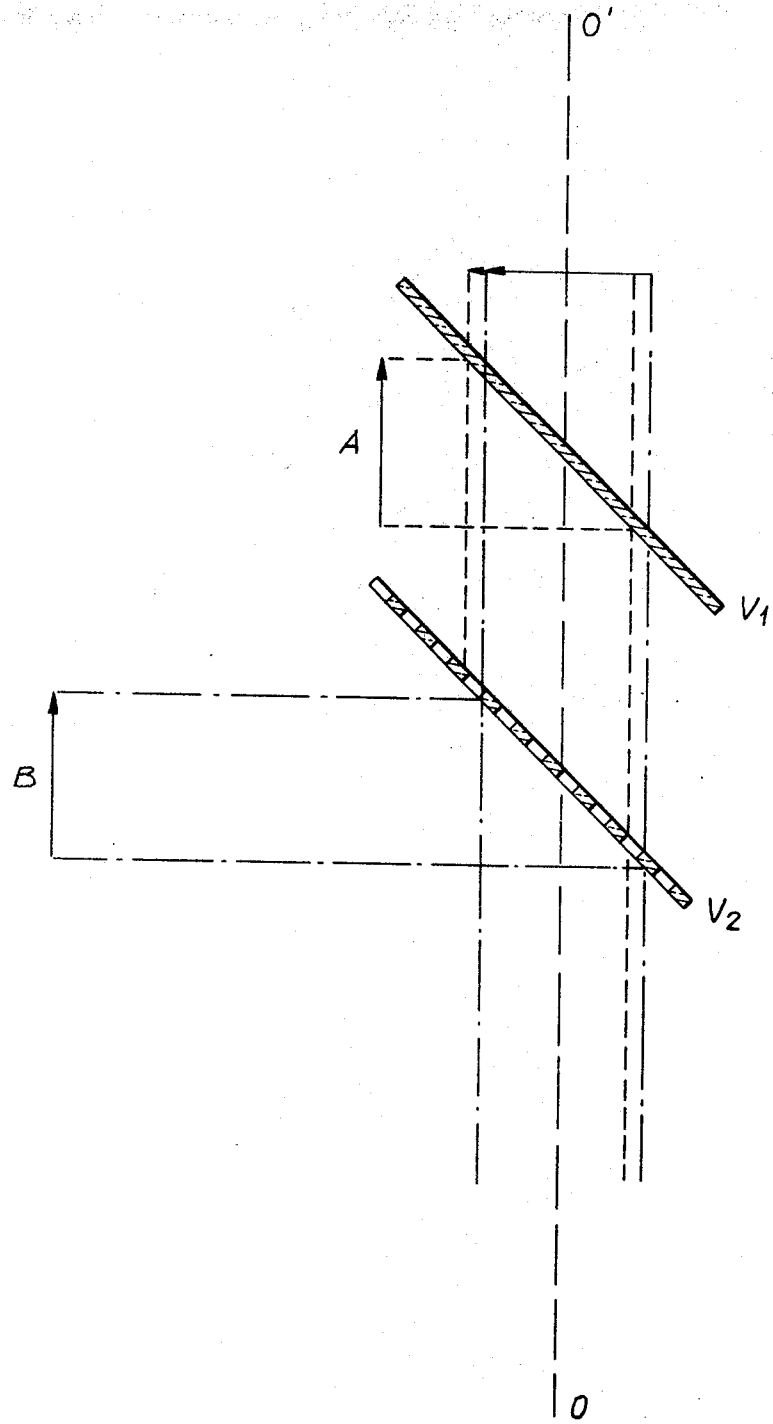
INVENTOR.
CLAUDIO PAGANELLI
BY
ATTORNEY

United States Patent Office

3,515,454
Patented June 2, 1970

3,515,454
SYSTEM FOR ARTIFICIALLY SEEING IN THREE DIMENSIONS WITHOUT USING GLASSES OR OTHER INTERPRETING MEANS
Claudio Paganelli, Via di Vigna Murata 1, Rome, Italy
Filed Oct. 21, 1966, Ser. No. 588,506
Int. Cl. G02b 27/24
U.S. Cl. 350—137      1 Claim

ABSTRACT OF THE DISCLOSURE

The three dimensional observation system set forth in the present disclosure permits three dimensional vision without intervening interpreting means by superimposition and merging of the reflection of two equal stereoscopic images by means of parallel obliquely positioned reflecting mirrors, one of which may be partly transparent.

---

This invention has for object to make people to see in three dimensions, given two stereoscopic images and without the intervention of any interpreting means, the resulting image, so that the viewer may be able to perceive the relief only through the natural interpretation provided by the eyes.

At present, the incorrect systems for obtaining the perception of the three dimensions, have all recourse to interposed interpretation means: polarized light system and, consequently, polarised glass goggles to view; two color image system, and consequently two-color glasses for the observer; system with grid type devices, interposed between the image and the viewing point, and consequently interpreting means; stereoscope for very small images, always of the binocular type and very prone to tire the sight.

With the previous systems, therefore, it is absolutely necessary that something intervenes in order to get the interpretation of the images; otherwise, the observer would not be in condition to perceive the relief.

The present system, on the contrary, eliminates the need for glasses or any other means, and leaves to the eyes only the task, very simple indeed, of effecting the three dimension interpretation.

The sense of sight, by means of the light rays it receives from the observed objects and owing to an immediate computation about their distance, will testify in a determining way the third dimension. Every object is, in effect, an assembly and an emanation of light rays, and the eyes, due to their natural position, receive simultaneously two slightly different images of the object and of everything surrounding it.

These two images, considered each one separately, are flattened images; by means of a single eye it is impossible to get the "relief" sense. This may be only perceived through an immediate telemetric computation by the eyes which, by virtue of their natural position, will select flattened images, slightly different from each other, of the objects present in the surrounding ambient.

According to the sense of sight, the relief feeling merges in a single and well defined figure in the space, by means of a perfect physiologic process. Therefore, the indispensable natural conditions which allow the eyes to perceive the relief are represented by the light and by the space.

Through the possibility of artificially realising these two indispensable natural conditions, the necessary warranties will be obtained so that the eyes may be able to effect their physiological operation and to see in three dimensions.

The opportunity for realising the above described is easily offered by two stereoscopic images which are equivalent to the natural images by the eyes, and by a perfectly reflecting surface which, due to its optical characteristics, is in condition to faithfully reproduce the natural depth of focusing field, i.e. the space.

Therefore, the present system, having recourse to reflecting and transparent means, superposes the virtual images obtained through the reflection of the two stereoscopic images into a single image, which, too, is virtual, and thus permits to the eyes to observe it in the same and identical natural conditions and to perceive, therefore, it as three-dimensional.

Schematically (see figure) we will arrange the two stereoscopic images, left and right respectively, A and B, duly illuminated, at the same level, perfectly parallel, the B image being more recessed and laterally displaced in respect of the A image, so that its reflection through the reflecting means $V_2$ will coincide with, and will merge into, the reflection of the A image through the reflecting means $V_1$.

Since $V_1$ and $V_2$ are aligned along the axis O–O' and they present the same incidence angle (45°, see drawing) in respect of the A and B images, and since $V_2$ is in part also transparent, the viewer in O will see in direction of O' the two reflections of the A and B images, united and superposed, and he will be able to perceive of them a single image, and 3-dimensional too.

For reasons of practical application, it will be possible to have also transpositions and additions (different from what is indicated in the drawing) of reflecting and transparent means, but the result shall be always the virtual image produced by the superposition of the two stereoscopic reflections. Furthermore, in the case of a too much small resulting image, it will be possible to arrange things so that the two reflected images slightly diverge, this result being obtained through an intervention upon the reflecting means (the right image being deviated toward the right eye, and the left image toward the left eye) in their respective seats, so that a binocular stereoscopic vision at distance will be obtained.

I can therefore, synthetically state that the virtual image resulting from the superposition of the reflections of two equal images having a stereoscopic character, through at least two reflecting means, one of which is partially only reflecting and in part also transparent, is interpreted in a 3-dimensional way.

It appears from the above that all the images, of any color, produced by any means, provided that they have a stereoscopic character, may be three-dimensionally viewed through the use of the present system.

I claim:
1. A stereoscopic viewing system having illuminating means and providing three dimensional observation of a pair of flattened stereoscopic images only through the natural interpretation of the eyes of an observer; comprising two spaced flattened stereoscopic images located at the same level and at right angles with respect to the optical axis and the viewing position, spaced apart parallel reflectors located on said optical axis and at the same level of said images with each reflector virtually imaging only one of said images, said parallel reflectors oriented at 45° to said optical axis and viewing location, said reflector nearest the observer being partly transparent, whereby said illuminated flattened stereoscopic images are perceived by an observer as a virtually superimposed stereoscopic image remote from said observer.

References Cited

UNITED STATES PATENTS

| | | | |
|---|---|---|---|
| 2,704,960 | 3/1955 | Loud | 350—137 |
| 2,951,417 | 9/1960 | Reeder et al. | 350—137 |
| 3,272,069 | 9/1966 | Ratliff | 350—137 |

FOREIGN PATENTS

| | | |
|---|---|---|
| 37,978 | 1954 | Poland. |
| 4,164 | 2/1899 | Great Britain. |
| 3,613 | 2/1895 | Great Britain. |
| 117,239 | 1/1901 | Germany. |

PAUL R. GILLIAM, Primary Examiner

U.S. Cl. X.R.

350—133, 144